O. C. RIXSON.
HOLDER FOR SWINGING CLOSURES.
APPLICATION FILED JAN. 26, 1917.
1,221,474. Patented Apr. 3, 1917.
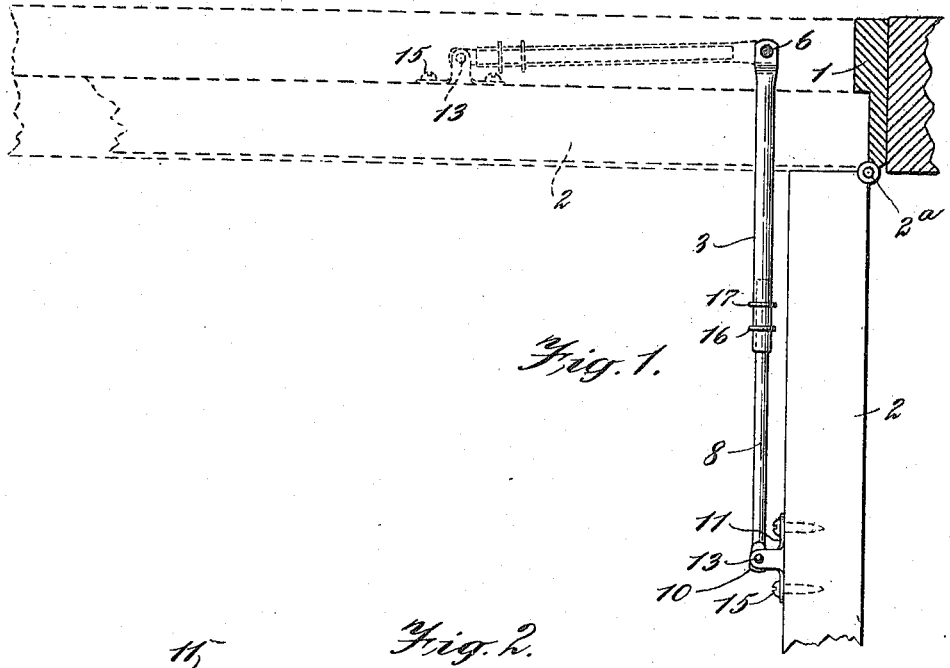
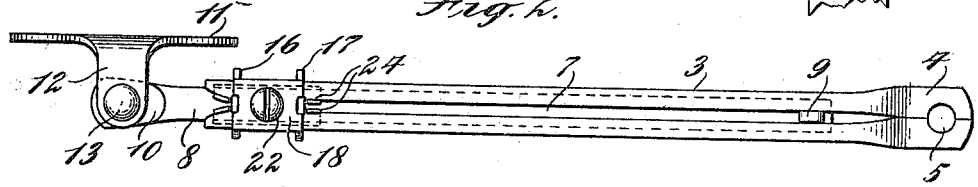
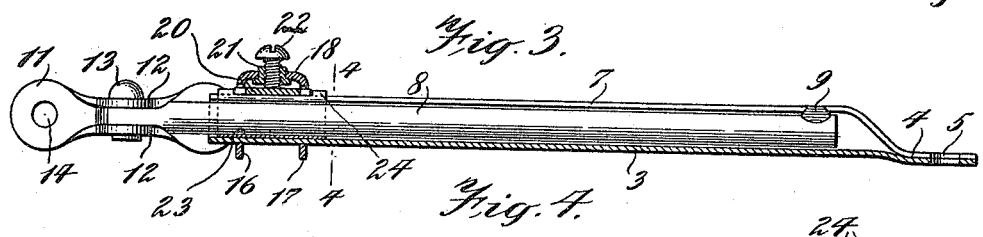
Inventor
Oscar C. Rixson
By his Attorneys

UNITED STATES PATENT OFFICE.

OSCAR C. RIXSON, OF NEW ROCHELLE, NEW YORK.

HOLDER FOR SWINGING CLOSURES.

1,221,474.	Specification of Letters Patent.	Patented Apr. 3, 1917.

Application filed January 26, 1917. Serial No. 144,633.

*To all whom it may concern:*

Be it known that I, OSCAR C. RIXSON, a citizen of the United States, residing at New Rochelle, in the county of Westchester and State of New York, have invented certain new and useful Improvements in Holders for Swinging Closures, of which the following is a full, clear, and exact description.

This invention relates to holders for swinging closures, such as transoms, hinged windows and the like.

More particularly the invention relates to holders comprising two or more members which are adapted to have a relatively sliding movement and to be pivotally secured to the swinging closure and its frame, respectively. By adjusting the friction between the sliding members the free movement of the swinging closure may be retarded to any required extent to hold it against inadvertent movement.

The objects of the invention are to provide a holder of this character which is of a cheap construction, economical to manufacture, and easily and quickly adjustable to provide the desired resistance between the parts of the holder so that a determinable force must be applied to the swinging closure to move it from one angular position to another.

To obtain the above objects, the invention contemplates a tubular member in which a rod is slidably mounted, which rod and tubular member are adapted to be pivotally secured at their free ends to the swinging closure and its frame. The friction between the rod and the swinging closure is obtained by providing a slotted tubular member and surrounding the split or slotted portion with a clamp which is adjustable to draw the tubular member more or less tightly around the rod. Preferably a split sleeve is interposed between the rod and tubular member so that the rod will not have an extended bearing surface in the tubular member.

In the accompanying drawings:

Figure 1 shows a holder constructed in accordance with the principle of the invention applied to a hinged door or window;

Fig. 2 shows an enlarged view of the holder in elevation;

Fig. 3 shows a longitudinal section through Fig. 2;

Fig. 4 shows a transverse section through the clamping device; and

Figs. 5 and 6 show details of the construction.

The holder may be used with any type of swinging closure, and in the drawings the frame of such a closure is indicated 1 and the closure 2, one of the hinges which permit the closure to swing inwardly being shown at 2$^a$.

The holder comprises a tubular member 3 which is preferably of sheet metal stamped and formed to provide a split tubular member with a flattened end portion 4 which is slightly offset from the main body of the tubular member. This flattened portion is provided with a hole or opening 5 therein, and a screw 6 or other fastening means passing through this hole pivotally secures the tubular member to the frame 1; the offset portion 4 permits the tubular member 3 to have a swinging movement without coming in contact with the frame. The edges of the strip of sheet metal which forms the tubular member 3 do not abut, but are spaced slightly apart to provide a slot 7 which extends the entire length of the tubular member. A rod 8 is telescopically fitted or slidably mounted within the tubular member 3 and is provided with a projection 9 at its inner end, which projection fits into the slot 7 and holds the rod 8 from rotation, although not interfering with its sliding movement. One end of this sliding rod projects beyond the tubular member 3 and is flattened as at 10, which flattened portion fits between two ears or lugs 12 formed upon an anchor-piece having a base plate 11. A pivot pin 13 passes through the ears 12 and flattened portion 10 pivotally securing these parts together. Openings 14 are provided in the base plate 11 through which screws 15 pass, which rigidly secure the base plate or anchor-piece to the swinging closure 2.

To retard the free movement of the rod 8 within the tubular member 3, a clamp is provided which surrounds the tubular member and consists of two rings or collars 16 and 17 which are connected by a saddle piece 18, the saddle piece being spaced from the tubular member 3, and in the space provided between the two collars 16 and 17 there is fitted the bridge-piece 20. This bridge-piece is curved to fit snugly over the tubular member 3 and is provided with lugs 20' which pass through openings 19 provided in the rings or collars 16 and 17, which construction prevents any movement of the bridge-piece 20 independently of the collars. The saddle piece 18 is provided with an opening through which a bushing 21 extends and threaded into this bushing is a set screw 22, whose point bears upon the bridge-piece 20 so that by adjusting the screw 22 the bridge-piece 20 coöperating with the collars 16 and 17 will draw the tubular member around the rod 8 until the desired friction between the rod and the tubular member is obtained.

A sleeve 23 of soft material, such as brass, is interposed between the rod 8 and the portion of the tubular member which is surrounded by the clamp. This sleeve is provided with ears 24 which project up into the slot 7 formed in the tubular member and engage the piece 20 or the rings 16 and 17 to prevent inadvertent movement of the sleeve in the tubular member. The sleeve 23 is of sufficient thickness to maintain the portions of the rod 8 which are not in engagement with the sleeve out of contact with the tubular member 7 so that in reality the clamping device described, when tightened, draws the split sleeve around the rod 8 and the friction occurs between this sleeve and the rod, rather than between the entire length of the tubular member and the rod. In practice this construction is utilized because if the rod 8 is in engagement with the tubular member 3 for substantially its entire length, it is difficult to adjust the friction between the two parts because of the relatively large area of the surfaces in frictional engagement.

I claim:

1. A holder for swinging closures comprising a tubular member having a slot therein, a rod freely slidable in said tubular member, means for pivotally securing said rod and member to a swinging closure and its frame, a split sleeve interposed between said rod and a slotted portion of said tubular member, and a clamping device surrounding said tubular member and sleeve for drawing said sleeve into frictional engagement with said rod.

2. A holder for swinging closures comprising a strip of sheet material stamped to form a tubular member having a flattened end portion, a rod freely slidable in said tubular member, a split sleeve interposed between said rod and tubular member, and a clamping device surrounding said tubular member and sleeve for drawing said sleeve into frictional engagement with said rod.

3. A holder for swinging closures comprising a strip of sheet material stamped to form a tubular member having a flattened end portion, a rod freely slidable in said tubular member, a split sleeve interposed between said rod and tubular member, a clamping device surrounding said tubular member and sleeve for drawing said sleeve into frictional engagement with said rod, and means for maintaining said sleeve in fixed relation to said tubular member.

In witness whereof, I subscribe my signature.

OSCAR C. RIXSON.